United States Patent
Keng et al.

(10) Patent No.: US 11,928,616 B2
(45) Date of Patent: Mar. 12, 2024

(54) METHOD AND SYSTEM FOR HIERARCHICAL FORECASTING

(71) Applicant: Kinaxis Inc., Ottawa (CA)

(72) Inventors: Brian Keng, Toronto (CA); Kanchana Padmanabhan, Toronto (CA)

(73) Assignee: Kinaxis Inc., Ottawa (CA)

( * ) Notice: Subject to any disclaimer, the term of this patent is extended or adjusted under 35 U.S.C. 154(b) by 576 days.

(21) Appl. No.: 16/647,748

(22) PCT Filed: Sep. 18, 2018

(86) PCT No.: PCT/CA2018/051155
§ 371 (c)(1),
(2) Date: Mar. 16, 2020

(87) PCT Pub. No.: WO2019/051615
PCT Pub. Date: Mar. 21, 2019

(65) Prior Publication Data
US 2020/0226504 A1    Jul. 16, 2020

Related U.S. Application Data

(60) Provisional application No. 62/559,911, filed on Sep. 18, 2017.

(51) Int. Cl.
*G06N 20/00* (2019.01)
*G06F 18/214* (2023.01)
(Continued)

(52) U.S. Cl.
CPC ........... *G06Q 10/04* (2013.01); *G06F 18/214* (2023.01); *G06N 20/20* (2019.01)

(58) Field of Classification Search
None
See application file for complete search history.

(56) References Cited

U.S. PATENT DOCUMENTS 6,128,415 A      10/2000  Hultgren, III et al.
7,398,268 B2 *   7/2008   Kim ................... G06F 16/284
(Continued)

OTHER PUBLICATIONS

Sun, Shiliang, Changshui Zhang, and Guoqiang Yu. "A Bayesian network approach to traffic flow forecasting." IEEE Transactions on intelligent transportation systems 7.1 (2006): 124-132. (Year: 2006).*

(Continued)

*Primary Examiner* — Gurkanwaljit Singh
(74) *Attorney, Agent, or Firm* — Borden Ladner Gervais (57) ABSTRACT

A system and method for generation of automated forecasts for a subject based on one or more input parameters. The subject located at an end node of a hierarchy. The method includes: receiving historical data associated with the subject; determining the sufficiency of the historical data based on a feasibility of building a machine learning model to generate a forecast with a predetermined level of accuracy using the historical data; building the machine learning model using the historical data when there is sufficiency of the historical data; building the machine learning model using historical data associated with an ancestor node on the hierarchy when there is not sufficiency of the historical data; generating a forecast for the subject using the machine learning model based on the one or more input parameters; and outputting the forecast.

15 Claims, 6 Drawing Sheets

(51) Int. Cl.
  *G06N 20/20* (2019.01)
  *G06Q 10/04* (2023.01)

(56) References Cited

U.S. PATENT DOCUMENTS

| | | | | |
|---|---|---|---|---|
| 7,971,180 | B2* | 6/2011 | Kreamer | G06Q 10/06 717/102 |
| 9,934,126 | B1* | 4/2018 | Mola | G06F 16/328 |
| 9,977,807 | B1* | 5/2018 | Bowman | G06F 16/381 |
| 10,339,470 | B1* | 7/2019 | Dutta | G06N 20/20 |
| 11,030,631 | B1* | 6/2021 | Mascaro | G06Q 40/123 |
| 11,080,336 | B2* | 8/2021 | Van Dusen | G06Q 50/184 |
| 2006/0010110 | A1* | 1/2006 | Kim | G06Q 40/00 |
| 2008/0313596 | A1* | 12/2008 | Kreamer | G06Q 10/06 717/101 |
| 2012/0303412 | A1* | 11/2012 | Etzioni | G06Q 30/06 705/7.31 |
| 2014/0079297 | A1* | 3/2014 | Tadayon | G06V 40/172 382/118 |
| 2014/0344013 | A1* | 11/2014 | Karty | G06N 3/126 705/7.29 |
| 2017/0235848 | A1* | 8/2017 | Van Dusen | G06N 5/02 705/12 |
| 2017/0255888 | A1 | 9/2017 | McCord et al. | |
| 2017/0323389 | A1* | 11/2017 | Vavrasek | G06Q 40/08 |
| 2018/0082172 | A1* | 3/2018 | Patel | G06N 3/08 |
| 2018/0204111 | A1* | 7/2018 | Zadeh | G06N 3/0436 |
| 2018/0284758 | A1* | 10/2018 | Cella | G05B 23/0264 |
| 2019/0066133 | A1* | 2/2019 | Cotton | G06F 17/11 |
| 2019/0205773 | A1* | 7/2019 | Ackerman | G06Q 10/067 |
| 2020/0004825 | A1* | 1/2020 | Pasternack | G06Q 10/107 |
| 2020/0279650 | A1* | 9/2020 | Sandholm | G16H 50/50 |

OTHER PUBLICATIONS

Caraviello, D. Z., et al. "Analysis of reproductive performance of lactating cows on large dairy farms using machine learning algorithms." Journal of dairy science 89.12 (2006): 4703-4722. (Year: 2006).*

Friedman, Jerome H. "Recent advances in predictive (machine) learning." Journal of classification 23.2 (2006): 175-197. (Year: 2006).*

International Patent Application No. PCT/CA2018/051155, International Preliminary Report on Patentability dated Apr. 2, 2020.

International Patent Application No. PCT/CA2018/051155 International Search Report and Written Opinion dated Jan. 17, 2019.

Kazmi et al., "Generic Framework to Predict Repeat Behavior of Customers using their Transaction History," 2016 EEE/WIC/ACM International Conference on Web Intelligence, Oct. 2016, pp. 449-452.

* cited by examiner

METHOD AND SYSTEM FOR HIERARCHICAL FORECASTING

TECHNICAL FIELD

The following relates generally to data processing, and more specifically, to a method and system for hierarchical forecasting.

BACKGROUND

A particularly useful implementation of data science techniques is the ability to generate forecasts based on historical data, input parameters, and other factors. Forecasting in data science is an area that can be used to gain a competitive advantage in various fields of endeavour.

Typically, when a forecast or prediction is made, the quality of the data plays an important role. In many circumstances, especially in today's data-driven world, there is a plethora of data available from which to generate the forecasts. However, in some cases, it can be problematic to generate forecasts when there is insufficient historical data traditionally used to make such a prediction.

It is therefore an object of the present invention to provide data forecasting in which the above disadvantages are obviated or mitigated and attainment of the desirable attributes is facilitated.

SUMMARY

In an aspect, there is provided a computer-implemented method for generation of an automated forecast for a subject based on one or more input parameters, the method executed on at least one processing unit, the subject associated with an end node of a categorical hierarchy, the method comprising: receiving historical data associated with the subject; determining the sufficiency of the historical data associated with the subject based on a feasibility of building at least one subject machine learning model to generate a forecast with a predetermined level of accuracy using the historical data associated with the subject; where there is sufficient historical data associated with the subject, building the at least one subject machine learning model trained using the historical data associated with the subject; where there is not sufficient historical data associated with the subject, building the at least one subject machine learning model trained using the historical data associated with the subject in combination with at least one of historical data and parameters of machine learning models associated with at least one ancestor node of the categorical hierarchy; receiving the one or more input parameters; generating a forecast for the subject using the at least one machine learning model provided with the one or more input parameters; and outputting the forecast.

In a particular case, the at least one ancestor node of the categorical hierarchy comprises the ancestor node in the level of the hierarchy directly above the end node associated with the subject.

In another case, the method further comprising: determining the sufficiency of the historical data associated with the subject and the ancestor node in the level of the hierarchy directly above the end node associated with the subject, the sufficiency based on the feasibility of building the at least one subject machine learning model to generate a forecast with a predetermined level of accuracy; where there is not sufficient historical data associated with the subject and the ancestor node in the level of the hierarchy directly above the end node associated with the subject, successively determining the sufficiency of the historical data associated with each higher ancestor node in the categorical hierarchy until there is sufficient historical data or the root node is reached, sufficiency determined by the feasibility of building the at least one subject machine learning model to generate the forecast with the predetermined level of accuracy using the historical data associated with the subject in combination with the historical data associated with the higher ancestor node and nodes in between the higher ancestor node and the subject node; and building the at least one subject machine learning model using the historical data associated with the subject in combination with at least one of historical data and parameters of machine learning models associated with the at least one ancestor node of the categorical hierarchy.

In yet another case, where there is not sufficient historical data associated with the subject and all the ancestor nodes up to the root node, further comprising outputting that there is insufficient data to form the forecast.

In yet another case, the method further comprising, where there is not sufficient historical data associated with the subject, determining other similar nodes having a similarity to the subject, and wherein building at least one of the at least one subject machine learning model comprises using historical data associated with the similar nodes.

In yet another case, wherein the similar nodes are those nodes that share a parent node with the subject in the categorical hierarchy.

In yet another case, the similar nodes are those nodes that share an ancestor with the subject in the categorical hierarchy.

In yet another case, the at least one subject machine learning model comprises a plurality of machine learning models, and wherein building the at least one subject machine learning model comprises combining predictions from each of the machine learning models to generate the forecast.

In yet another case, combining the predictions comprises stacking the plurality of machine learning models by building a meta-model to generate the forecast, the meta-model trained using the predictions from each of the machine learning models as features to the meta-model.

In yet another case, the method further comprising receiving the structure of the categorical hierarchy.

In another aspect, there is provided a system for generation of an automated forecast for a subject based on one or more input parameters, the subject associated with an end node of a categorical hierarchy, the system comprising at least one processing unit and a data storage, the at least one processing unit in communication with the data storage and configured to execute: an analysis module to receive historical data associated with the subject, and determine the sufficiency of the historical data associated with the subject based on a feasibility of building at least one subject machine learning model to generate a forecast with a predetermined level of accuracy using the historical data associated with the subject; and a forecasting module to: where there is sufficient historical data associated with the subject, build the at least one subject machine learning model trained using the historical data associated with the subject; where there is not sufficient historical data associated with the subject, build the at least one subject machine learning model trained using the historical data associated with the subject in combination with at least one of historical data and parameters of machine learning models associated with at least one ancestor node of the categorical hierarchy; receive the one or more input parameters; generate a forecast for the subject using the at least one machine learning model provided with the one or more input parameters; and output the forecast.

In a particular case, the at least one ancestor node of the categorical hierarchy comprises the ancestor node in the level of the hierarchy directly above the end node associated with the subject.

In another case, the analysis module further determines the sufficiency of the historical data associated with the subject and the ancestor node in the level of the hierarchy directly above the end node associated with the subject, the sufficiency based on the feasibility of building the at least one subject machine learning model to generate a forecast with a predetermined level of accuracy, and where there is not sufficient historical data associated with the subject and the ancestor node in the level of the hierarchy directly above the end node associated with the subject, successively determines the sufficiency of the historical data associated with each higher ancestor node in the categorical hierarchy until there is sufficient historical data or the root node is reached, sufficiency determined by the feasibility of building the at least one subject machine learning model to generate the forecast with the predetermined level of accuracy using the historical data associated with the subject in combination with the historical data associated with the higher ancestor node and nodes in between the higher ancestor node and the subject node, and wherein the forecasting module further builds the at least one subject machine learning model using the historical data associated with the subject in combination with at least one of historical data and parameters of machine learning models associated with the at least one ancestor node of the categorical hierarchy.

In yet another case, where there is not sufficient historical data associated with the subject and all the ancestor nodes up to the root node, the forecasting module outputs that there is insufficient data to form the forecast.

In yet another case, where there is not sufficient historical data associated with the subject, the analysis module determines other similar nodes having a similarity to the subject, and wherein the forecasting module builds at least one of the at least one subject machine learning model using historical data associated with the similar nodes.

In yet another case, the similar nodes are those nodes that share a parent node with the subject in the categorical hierarchy.

In yet another case, the similar nodes are those nodes that share an ancestor with the subject in the categorical hierarchy.

In yet another case, the at least one subject machine learning model comprises a plurality of machine learning models, and wherein building the at least one subject machine learning model comprises combining predictions from each of the machine learning models to generate the forecast.

In yet another case, combining the predictions comprises stacking the plurality of machine learning models by building a meta-model to generate the forecast, the meta-model trained using the predictions from each of the machine learning models as features to the meta-model.

These and other embodiments are contemplated and described herein. It will be appreciated that the foregoing summary sets out representative aspects of systems and methods to assist skilled readers in understanding the following detailed description.

BRIEF DESCRIPTION OF THE DRAWINGS

The features of the invention will become more apparent in the following detailed description in which reference is made to the appended drawings wherein.

DETAILED DESCRIPTION

Embodiments will now be described with reference to the figures. For simplicity and clarity of illustration, where considered appropriate, reference numerals may be repeated among the Figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

Any module, unit, component, server, computer, terminal, engine or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Further, unless the context clearly indicates otherwise, any processor or controller set out herein may be implemented as a singular processor or as a plurality of processors. The plurality of processors may be arrayed or distributed, and any processing function referred to herein may be carried out by one or by a plurality of processors, even though a single processor may be exemplified. Any method, application or module herein described may be implemented using computer readable/executable instructions that may be stored or otherwise held by such computer readable media and executed by the one or more processors.

In the following, "SKU" refers to a stock keeping unit and can be generally interpreted as referring to a type of product, entity and/or service that is offered for sale.

The following relates generally to data processing, and more specifically, to a method and system for automated hierarchical forecast generation.

Figure 1:
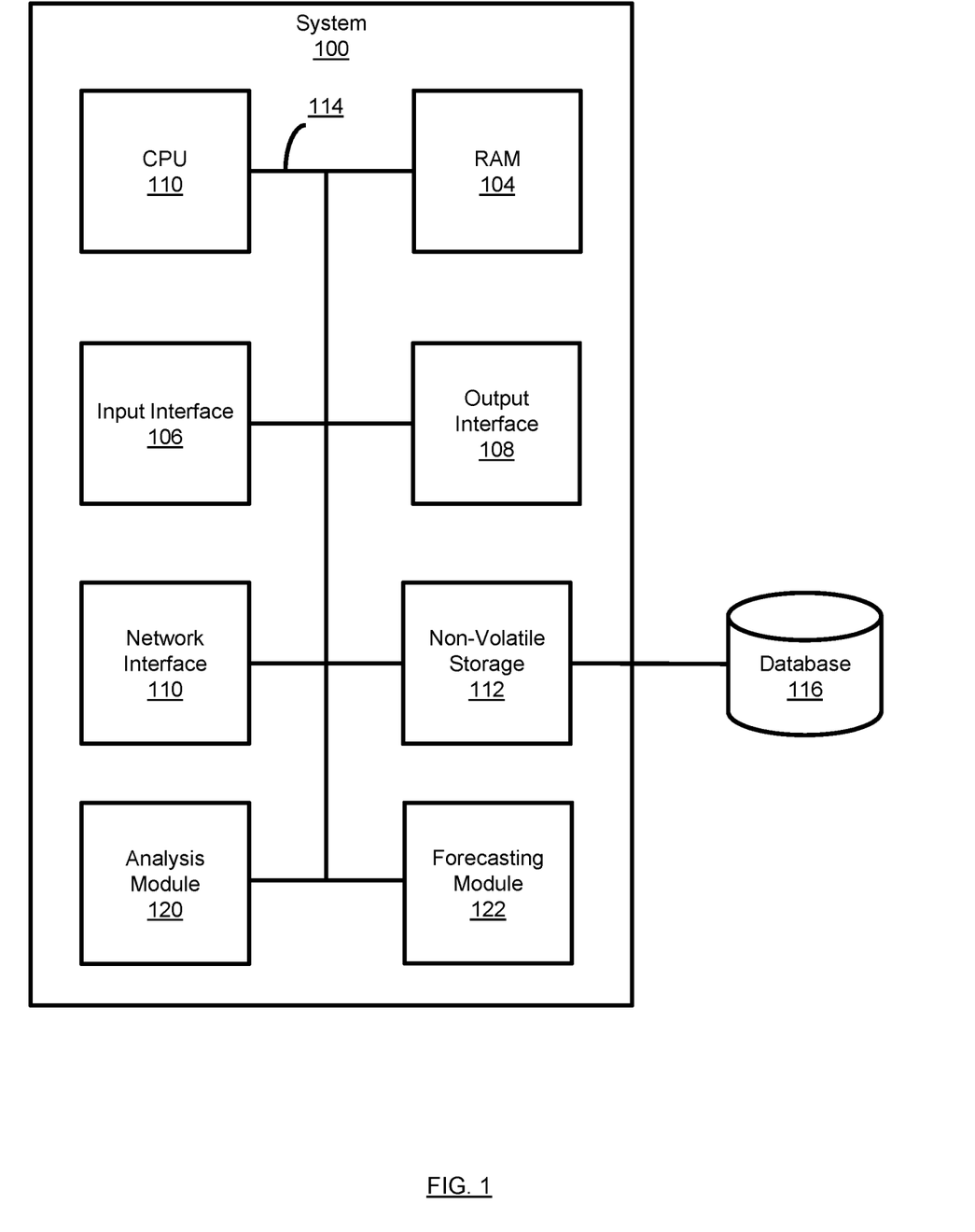
FIG. 1 is a schematic diagram of a system for automated forecasts for a subject based on one or more input parameters, in accordance with an embodiment.
Figure 2:
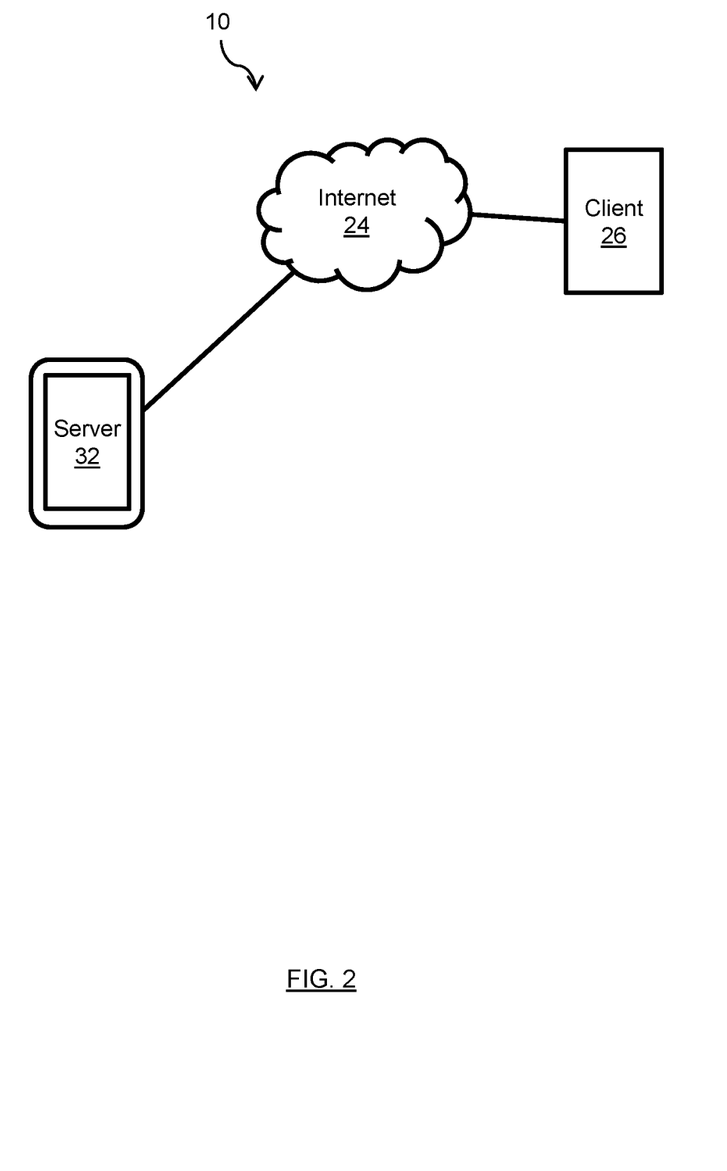
FIG. 2 is a schematic diagram showing the system of FIG. 1 and an exemplary operating environment.

Referring now to FIG. 1, a system 100 for hierarchical forecasts, in accordance with an embodiment, is shown. In this embodiment, the system 100 is run on a server (32 in FIG. 2). In further embodiments, the system 100 can be run on any other computing device; for example, a desktop computer, a laptop computer, a smartphone, a tablet computer, a point-of-sale ("PoS") device, a smartwatch, or the like.

In some embodiments, the components of the system 100 are stored by and executed on a single computer system. In other embodiments, the components of the system 100 are distributed among two or more computer systems that may be locally or globally distributed.

FIG. 1 shows various physical and logical components of an embodiment of the system 100. As shown, the system 100 has a number of physical and logical components, including a central processing unit ("CPU") 102 (comprising one or more processors), random access memory ("RAM") 104, an input interface 106, an output interface 108, a network interface 110, non-volatile storage 112, and a local bus 114 enabling CPU 102 to communicate with the other components. CPU 102 executes an operating system, and various modules, as described below in greater detail. RAM 104 provides relatively responsive volatile storage to CPU 102. The input interface 106 enables an administrator or user to provide input via an input device, for example a keyboard and mouse. The output interface 108 outputs information to output devices, such as a display and/or speakers. The network interface 110 permits communication with other systems, such as other computing devices and servers remotely located from the system 100, such as for a typical cloud-based access model. Non-volatile storage 112 stores the operating system and programs, including computer-executable instructions for implementing the operating system and modules, as well as any data used by these services. Additional stored data, as described below, can be stored in a database 116. During operation of the system 100, the operating system, the modules, and the related data may be retrieved from the non-volatile storage 112 and placed in RAM 104 to facilitate execution.

In an embodiment, the system 100 further includes an analysis module 120 and a forecasting module 122. As described herein, to generate the forecast, the system 100 can use a machine learning model and/or statistical model to determine the prediction.

Forecasting is the process of obtaining a predicted future value for a subject using historical data. In many cases, forecasts are predicated on there being a plethora of data from which to generate one or more predictions. In these cases, machine learning techniques can rely on the plethora of historical data in order to train their models and thus produce reasonably accurate forecasts.

As an example, a system to predict sales of a SKU in a store may use time-series forecasting based on historical sales of that SKU in previously similar months or seasons. As a specific example, in the retail space, a system can be used to obtain the number of units of jam that will be sold in September 2017 using the historical sales for jam for that past 5 years.

However, in some cases, it can be problematic to generate forecasts when there is insufficient historical data to make a forecast of the future with a reasonable level of confidence. In the above example, insufficiency of historical data can become a problem if, for example, the SKU is brand new and has no history, the SKU is relatively new and there is only a limited period of historical data available (for example, was introduced within the last 6 months), the SKU has not been sold in that particular store, the SKU does not have sufficient variations, or the SKU has insufficient serviceable historical data for any other reason.

Accordingly, for the above scenarios with insufficient or sparse historical data, the embodiments described herein advantageously provide a technological approach to generate a forecast, for example for the SKU, with a practically useable degree of confidence. For example, generating forecasts where there are new SKUs, SKUs with insufficient history, SKUs with data sparsity issues, or the like. The embodiments described herein can also advantageously make predictions where there exists a certain feature type in the data history, but a new feature type is required for the prediction. For example, for forecasting the results of a promotion for a given SKU, the embodiments described herein can be used to generate forecasts where SKUs have only been on one type of promotion in its history but assigned a new promotion type in a future promotion.

In another intended advantage provided by the embodiments described herein, a system is provided that can automatically generate forecasts for both subjects with sufficient historical data and subjects with insufficient historical data.

In another intended advantage provided by the embodiments described herein, a system is provided that can automatically generate forecasts for a subject with varying maturity in terms of history.

In another intended advantage provided by the embodiments described herein, a system is provided that can automatically assign a weight specific to each subject, in each model in an ensemble, to denote model importance.

Figure 3:
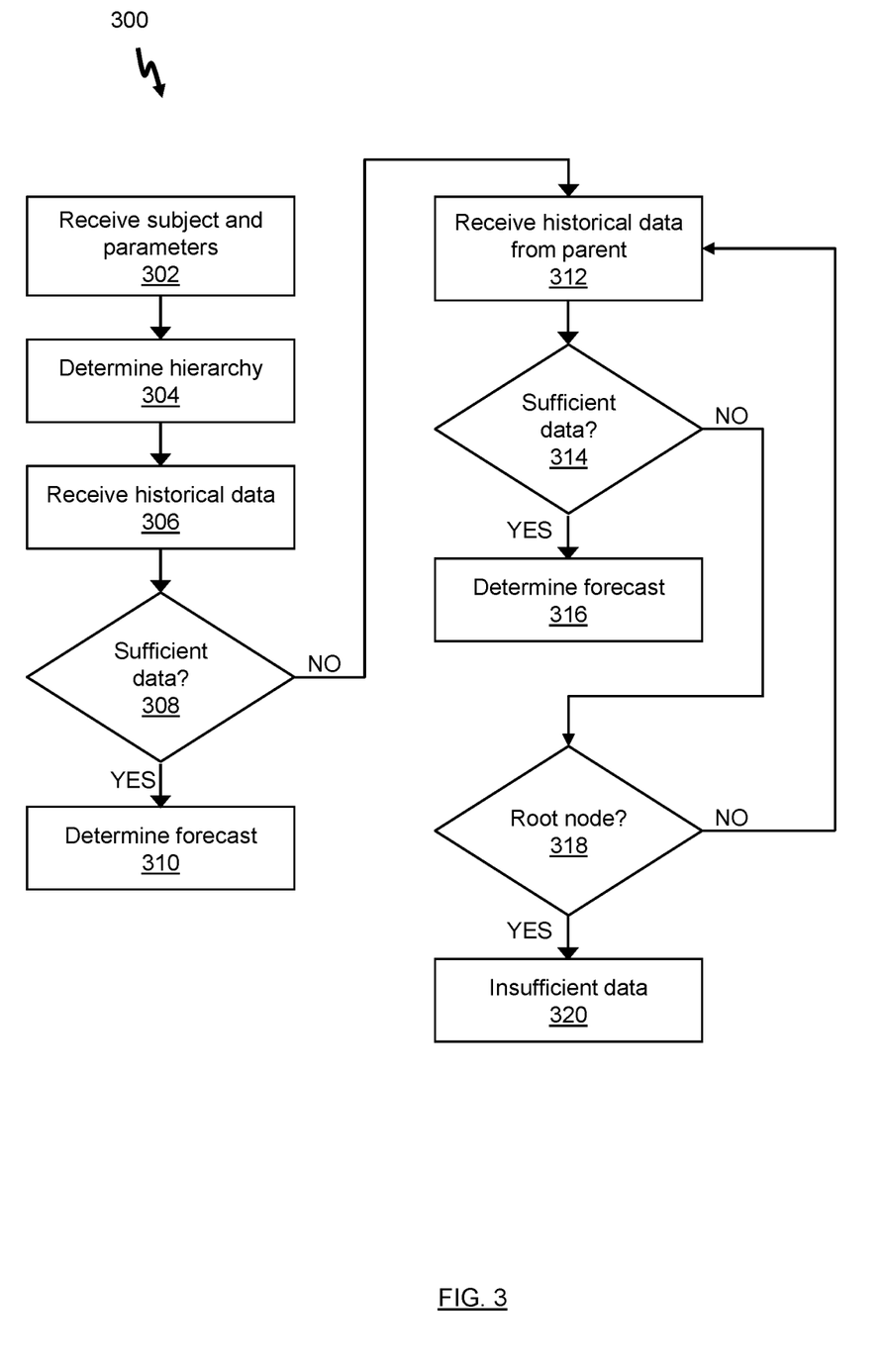
FIG. 3 is a flow chart of a method for automated forecasts for a subject based on one or more input parameters, in accordance with an embodiment.

FIG. 3 illustrates a flowchart for a method 300 for hierarchical forecasts, according to an embodiment.

At block 302, the analysis module 120 receives a subject for forecasting and input parameters associated with the subject or the forecast via the input interface 106 or network interface 110.

At block 304, the analysis module 120 generates a hierarchical structure with the subject as a lowest-level descendant (or external node). In some cases, a trained machine learning model can be used to classify the subject and other nodes into a hierarchical structure. In other cases, the hierarchical structure can be received or retrieved by the analysis module 120 from the database 116, input interface 106, or network interface 110.

At block 306, the analysis module 120 receives or retrieves historical data associated with the subject for forecasting from the database 116, input interface 106, or network interface 110.

At block 308, the analysis module 120 analyzes the sufficiency of the historical data associated with the subject. The historical data will be deemed sufficient if there is enough historical data to form a trained machine learning model to a predetermined level of accuracy.

At block 310, if the analysis module 120 determines that there is sufficient historical data, the forecasting module 122 determines a forecast for the subject, based on the input parameters, using a machine learning model trained with the historical data, which is returned by the system 100.

At block 312, if the analysis module 120 determines that there is insufficient historical data, the analysis module 120 receives or retrieves historical data associated with a node of the hierarchy that is one level above the subject (the parent node of the subject) from the database 116, input interface 106, or network interface 110.

At block 314, the analysis module 120 determines if there is sufficient historical data at the parent node to generate a forecast.

At block 316, if the analysis module 120 determines that there is sufficient historical data at the parent node, the forecasting module 122 determines a forecast for the subject, based on the input parameters, using a machine learning model trained with the historical data associated with the parent node, which is returned by the system 100.

At block 318, if the analysis module 120 determines that there is insufficient historical data associated with the parent node, the analysis module 120 determines whether the parent node is a root node of the hierarchy (i.e., the top node with no parents). At block 320, if the parent node is the root node, the system 100 returns that there is insufficient data to form a forecast.

If the parent node is not the root node, the system 100 repeats block 312 on progressively higher levels of the hierarchy (progressive ancestor nodes) until the analysis module 120 determines that a node with sufficient historical data has been located. When such an ancestor node is located, at block 314, the forecasting module 122 determines a forecast for the subject, based on the input parameters, using a machine learning model trained with the historical data associated with the located ancestor node.

Figure 4:
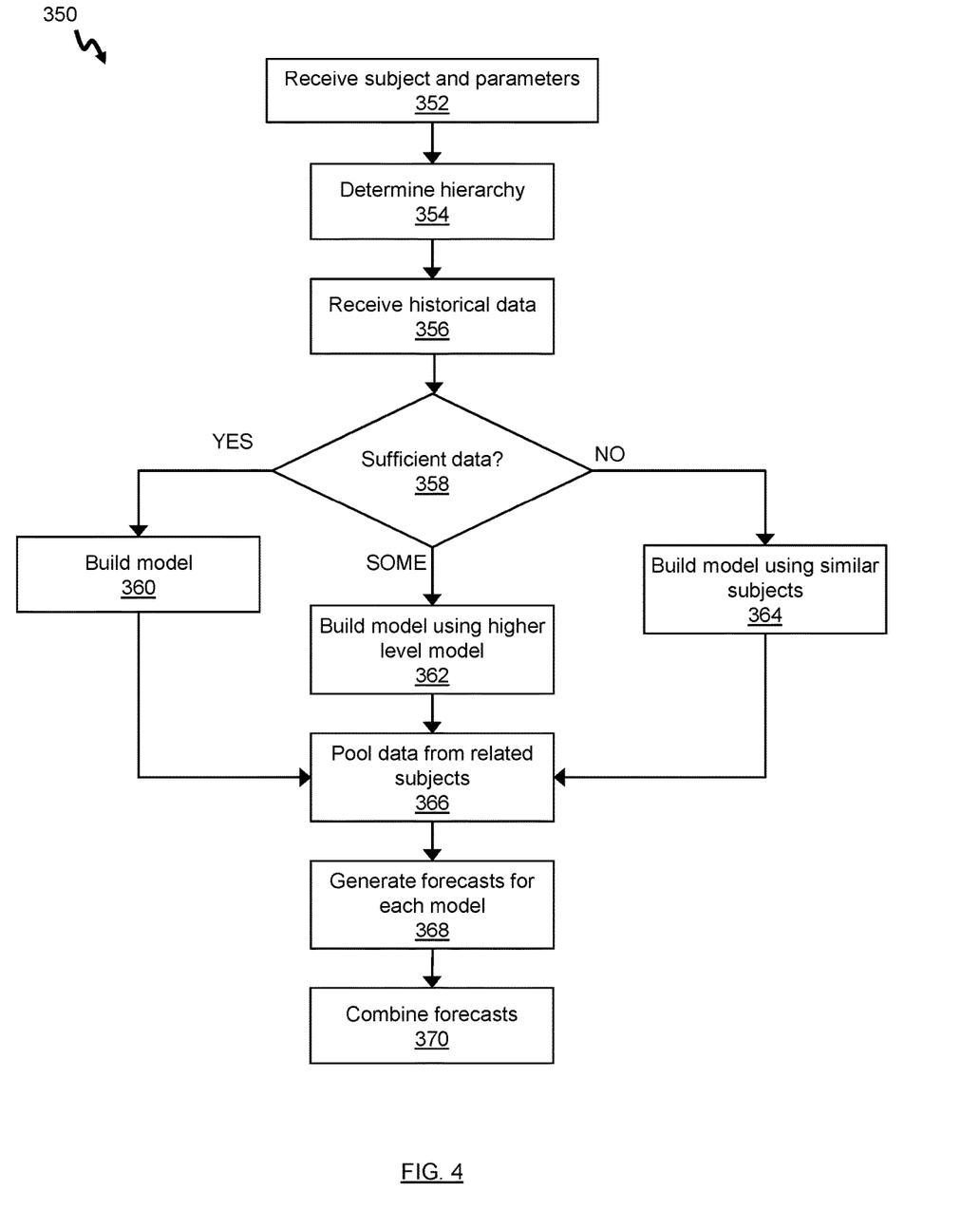
FIG. 4 is a flow chart of a method for automated forecasts for a subject based on one or more input parameters, in accordance with another embodiment.

FIG. 4 illustrates a flowchart for a method 350 for hierarchical forecasts, according to another embodiment.

At block 352, the system 100 receives a subject for forecasting and parameters associated with the subject or the forecast from the input interface 106 or network interface 110.

At block 354, the analysis module 120 generates a categorical hierarchical structure with the subject as a lowest-level descendant (or external node). In other cases, the hierarchical structure can be received or retrieved by the analysis module 120 from the database 116, input interface 106, or network interface 110.

At block 356, the analysis module 120 receives or retrieves historical data associated with the subject for forecasting from the database 116, input interface 106, or network interface 110.

At block 358, the analysis module 120 analyzes the sufficiency of the historical data associated with the subject. The historical data will generally be deemed sufficient if there is enough historical data to build a machine learning model to a predetermined level of accuracy.

At block 360, if the analysis module 120 determines that there is sufficient historical data, the forecasting module 122 builds one or more machine learning models with the historical data associated with the subject. The one or more models can include both interpolation models (for example, Random Forest) and extrapolation models (for example, Linear Regression).

For the case where, while there is some historical data, the analysis module 120 determines that the historical data associated with the subject is insufficient to obtain reliable predictions using a machine learning model, the forecasting module 122 can increase reliability of the machine learning model by adjusting the model parameters. In this case, at block 362, the forecasting module 122 builds one or more machine learning models using parameters of machine learning models built at other higher levels of the hierarchy. In order to do so, the forecasting module 122 can extract parameters related to the subject from other layers of the hierarchy.

As an example, assuming there are n-number of model parameters used for prediction, the forecasting module 122 generates a machine learning model that is trained with a weight or importance assigned to each of the n-number of model parameters. When the historical data for the subject is sparse, the weighting or importance for the various model parameters may not be sufficiently reliable. However, as above, when the forecasting module 122 trains the machine learning model with historical data associated with one or more nodes at a higher level of the hierarchy, the forecasting module 122 can make use of more training data, and thus, can generate a more effective estimate of the weight or importance of the model parameters.

In an example, the forecasting module 122 can use parameters for models trained at higher levels of the hierarchy. For example, using regression models, one or more models can be trained at the higher level of the categorical hierarchy. Coefficients of the various features can be obtained at the higher level, and such coefficients can be used to obtain a better estimate for the model in the lower level in the categorical hierarchy.

At block 364, in some cases, if the analysis module 120 determines that there is no, or almost no, historical data associated with the subject, the forecasting module 122 can obtain historical data associated with comparable or similar subjects. This other historical data can then be used in training of the machine learning model. The similar subjects can be manually chosen by a user via the input interface 106 or can be automatically chosen by the forecasting module 122. For the latter case, the forecasting module 122 can define a metric of "similarity" between subjects using, for example, at least one of hierarchy (for example, other subjects sharing similar parent or ancestor nodes), history of relatedness, or other parameters or characteristics relating to similarity. In some cases, the forecasting module 122 can use a machine learning model to assess the similarities and generate a ranked or classified output of other similar subjects. The forecasting module 122 can then train the machine learning model using the historical data associated with one or more "similar" subjects. In various examples, machine learning methodologies, such as clustering subjects or vector representations of subjects, can be utilized to assess the similarities between one subject and the other subjects using one or more different dimensions (for example, hierarchy, metadata, parameters, descriptions, or the like). In some cases, such machine learning methodologies can also rank the similarities in each of the dimensions.

At block 366, in some cases of the present embodiment, the forecasting module 122 can pool historical data together associated with additional subjects having related ancestors to the subject. Such additional pooling can be used to supplement and increase the accuracy of machine learning models based on the historical data associated with the subject; even in circumstances where the historical data associated with the subject has been deemed sufficient. In this way, the forecasting module 122 can estimate the effects of circumstances and parameters that have not been associated yet with the subject, and therefore are not reflected in its historical data.

At block 368, the forecasting module 122 generates a forecast for the subject based on the historical data and parameters for each of the trained machine learning models.

At block 370, the forecasting module 122 combines the outputs from the trained machine learning models, to generate an ensemble of models; for example, using statistical measures such as a median value or mean value. In other cases, the outputs can be combined by the forecasting module 122 using "stacking" by building another machine learning model, referred to as a meta-model, on the basis of the ensemble of models. The meta-model can also be trained using the outputs of each of the models in the ensemble models as features. In some cases, during the training phase, the meta-model can assign an "importance" to each of the models in the ensemble.

Advantageously, hierarchical grouping provides a grouping of subjects for forecasting at different levels of granularity.

In other cases, the analysis module 120 can determine if there is sufficient historical data at one or more nodes at the same level of the hierarchy as the subject or parent under analysis (sibling nodes). If so, the forecasting module 122 can determine a forecast for the subject, based on the parameters, using a machine learning model trained with the historical data associated with the one or more sibling nodes, which is returned by the system 100.

In some cases, the forecast, or the determination that that there is insufficient data to form a forecast, returned by the system 100 can be outputted to the output interface 108, stored in the database 116, or sent externally via the network interface 110. In some cases, for forecasts outputted to the output interface 108, the output interface 108 can generate a representation for the forecasts. In an example, the representation of the forecast may be in the form of, for example, graphs, text, charts, or the like.

In some cases, the forecasting module 122 can use a best fit model to generate the forecast of the subject based on the input parameters, such as through utilizing an evolutionary algorithm. In other cases, the forecasting module 122 may rely on machine learning and/or neural network analysis. Generally, the forecasting comprises a mapping of inputs to outputs, such as, for example, according to the function y=f(x). Based on a forecast y, and driven by a function for determining the forecast, the inputs x can be determined. Techniques employed in generating forecasts may include predictive modeling, sensitivity analysis, basket analysis, root cause analysis, and analysis of external factors. In some cases, the forecasting module 122 may model each subject or each subject type by using a regression analysis.

In some cases, the forecasting module 122 can be a set of data mining and machine learning building blocks, working in conjunction with the other modules, to generate predictive or explanatory scores of the outcomes of the promotion. The scores can be based on the historical data, as described above. Both supervised and unsupervised learning techniques can be used in generating the scores. These scores can then be used to determine the forecast.

In an example, a steady state of the forecasting module 122 can shift over to a reinforcement learning hybrid approach. As further data is collected by the system 100, at relevant levels of the hierarchy, the machine learning model can be re-trained and re-scored, and, as a result, new predictions can be made for the forecast. This reinforcement learning and feedback approach can be invoked repeatedly to further hone each of the machine learning models.

In some cases, the forecasting module 122 can change or re-train the machine learning models, at various levels of the hierarchy, with which the scores themselves are being calculated. In some cases, the forecasting module 122 can perform reinforcement learning "concurrently" with the receiving of outcome of prior predictions, enabling the forecasting module 122 to continue to learn the outcomes and adjust forecasts accordingly. Accordingly, the forecasting module 122 can be considered an artificially intelligent agent.

The historical data that the forecasting module 122 uses to train the machine learning model can be gathered from a variety of sources, including users and other computing devices.

In some cases, the forecasting module 122 uses the historical data to train one or more of the machine learning models of the hierarchy, such that the machine learning model can be used to make forecasts. In further cases, one or more of the machine learning models of the hierarchy may be a previously trained machine learning model retrieved by the system 100.

In an exemplary application of the system 100 and method 300, a forecast can be generated for sales of a SKU on a certain date; for example, as a result of a promotion. In this case, the SKU is the subject and the parameters are the date, the requirement for the output to be sales of the SKU, and the mechanics of the promotion.

Figure 5:
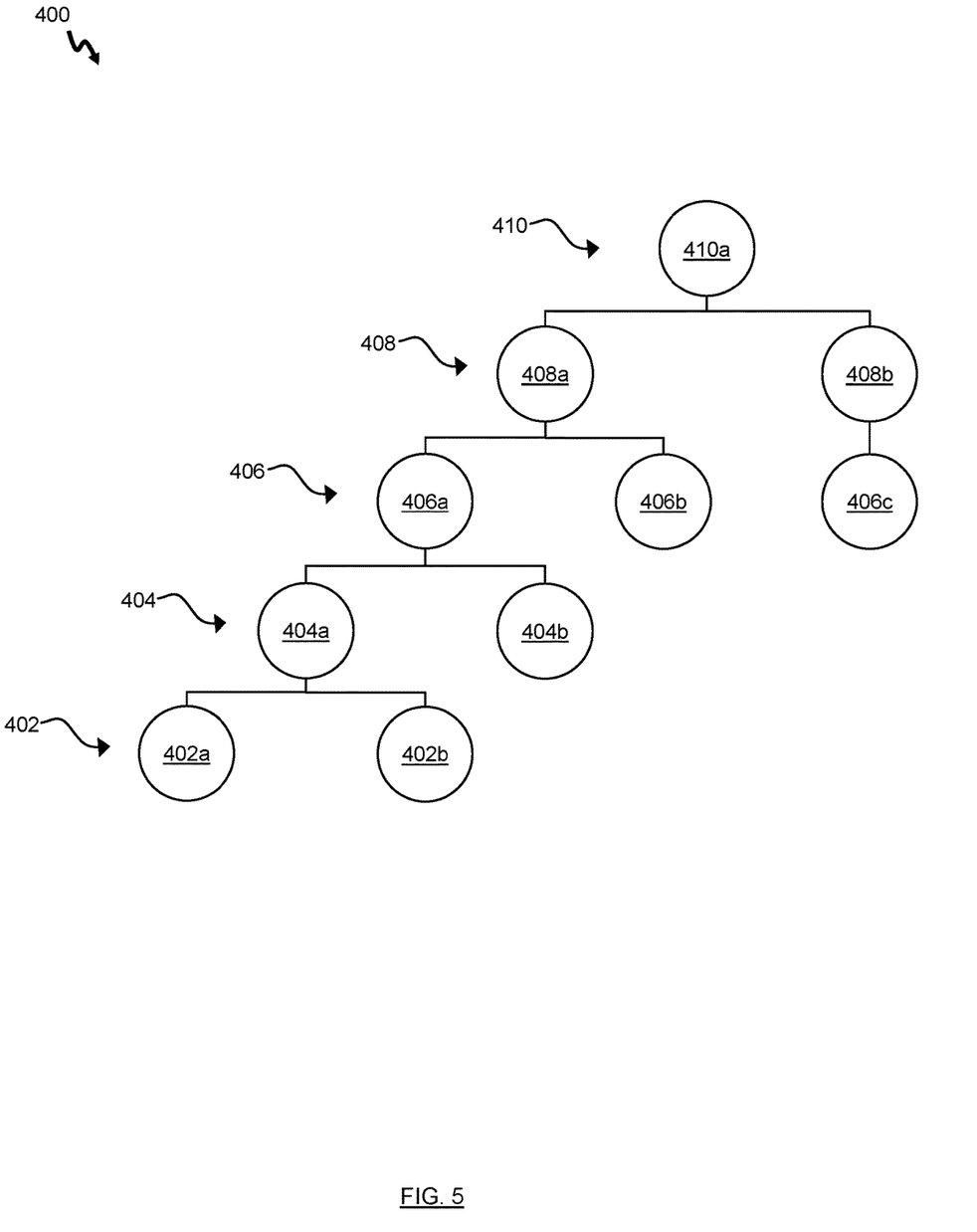
FIG. 5 is a diagram of an exemplary hierarchy.

In this example, as shown in FIG. 5, a hierarchy 400 can be generated from the classifying structure of products. The hierarchy 400 may be a product hierarchy, such as a top-down classification of SKUs found in a store from the product department all the way down to individual SKUs. The subject of the forecast is one of the individual SKUs; in this example, a first SKU 402a or a second SKU 402b. The parent of the SKUs 402 is the product brand 404 of the SKU; in this example, a first product brand 404a. The parent of the product brand 404 is the product subcategories 406; in this example, a first product subcategory 406a. The parent of the product subcategories 406 is the product categories 408; in this example, a first product category 408a. The parent of the product categories 408 is the product department 410, which is the root node; in this example, a root product department 410a. In this way, an individual SKU, here the first SKU 402a (as an example, a product like "Smith's face wash") can be found at the lowest level of the hierarchy. The first SKU 402a is associated with one of the brands, the first product brand 404a (in this example, "Smith's"). The first product brand 404a is associated with one of the subcategories 406a, the first product subcategory (in this example, "face wash"). The first product subcategory 406a is associated with one of the categories, the first product category 408a (in this example, "personal wash"). Finally, the first product category 408a is associated with the department 410a (in this example, "cosmetic and toiletry").

In this example, the system 100 takes as input the SKU 402a (as the subject) and a date and sales price (as the parameters) for which a forecast is required, and generates as output, a forecast of the predicted sales. Advantageously, for forecasting a single SKU 402a, the system 100 can build and use multiple different models, whereby the output from each of the models can then be combined to produce the final output.

Figure 6:
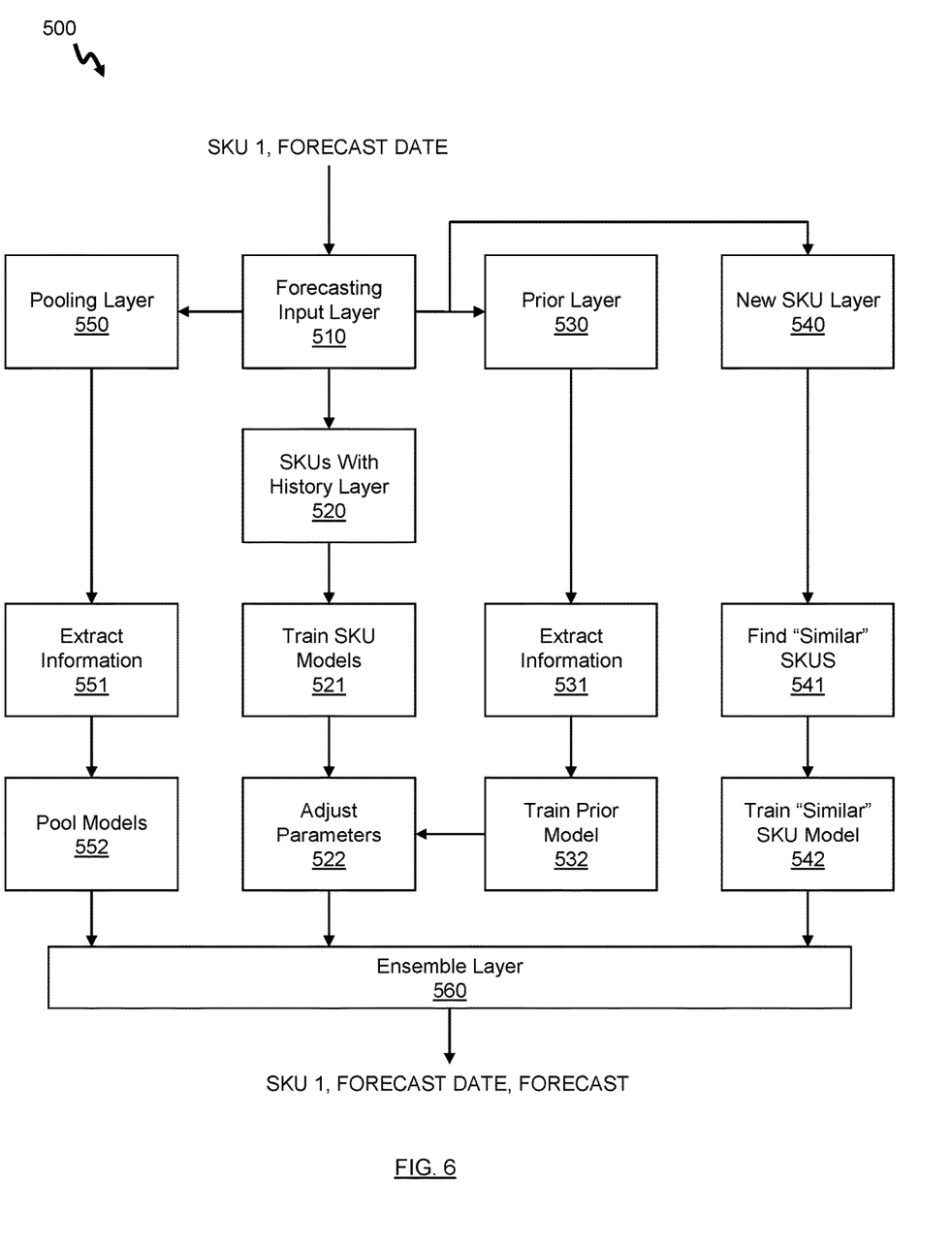
FIG. 6 is a flow chart of an exemplary embodiment.

As an example of the embodiments described herein, as shown in the diagram 500 of FIG. 6, the forecasting module 122 can use different "layers", each comprising one or more blocks, to generate the different models, along with a "layer" that combines the outputs from the individual models.

At a "forecasting input" layer 510, the forecasting module 122 receives the subject SKU and the date of forecast parameter, along with any other parameters.

At an "SKUs with history" layer 520 is used to build one or more machine learning models with the SKU-specific historical data. The one or more models can include both interpolation models (for example, Random Forest) and extrapolation models (for example, Linear Regression). At block 521, the forecasting module 122 can train one or more SKU models; for example different types of machine learning models can be trained using the same or similar historical data. In an intended advantage, different types of models can learn different patterns from the historical data, and so by combining such models, the system can be able to cover an entire space, or greater space, of patterns available in the data.

A "prior layer" 530 is used when the SKU has very limited historical data (in this example, such as less than 6 months of historical data). In this case, the historical data may be insufficient to obtain reliable estimates of model parameters using a machine learning model. At block 531, the analysis module 120 or forecasting module 122 can extract SKU related information from the hierarchy 400. At block 532, the forecasting module 122 can train a prior model on a chosen level (e.g., subcategory) of the hierarchy 400, as described herein.

At block 522, as part of the "SKUs with history layer" 520 and/or the "prior layer" 530, the system 100 can improve the reliability of the machine learning model parameters by adjusting the SKU level model parameters using parameters of machine learning models built at other higher levels of the product hierarchy. For example, the SKU level model estimates can be adjusted using a comparable machine learning model trained using historical data at the subcategory level.

A "new SKU" layer 540 can be used for SKUs with no historical data. In this case, at block 541, the forecasting module 122 can obtain historical data associated with comparable or "similar" SKUs from the hierarchy 400 that can be used in the training. The similar SKUs can be manually chosen by a user via the input interface 106 or can be automatically chosen by the forecasting module 122. For the latter case, the forecasting module 122 can define a metric of "similarity" between SKUs using, for example, at least one of product hierarchy (for example, SKUs that occur within the same subcategory or brand are likely similar), promotion history (SKUs that are promoted together are likely similar), or other SKU parameters or characteristics (for example, gender bias, mass, prestige, age bias, etc.). The forecasting module 122 can use a machine learning model to assess the similarities and generate an output of the top N-number of similar SKUs for a given input SKU. At block 542, the forecasting module 122 can train the SKU level models using the set of "similar" SKUs; for example different types of machine learning models can be trained using the same or similar historical data.

A "pooling" layer 550 can be used to pool historical data together. Any one SKU, even those with a large quantity of associated historical data, will most likely not have historical data associated with an entire breadth of different circumstances and parameters reflected in its history. Thus, for increased accuracy, it can be useful to "pool" historical data from other SKUs. In this way, the forecasting module 122 can estimate the effects of circumstances and parameters that have not been seen before for the subject SKU and therefore are not reflected in its historical data. In accordance with an embodiment herein, the analysis module 120 or forecasting module 122 can find other SKUs to pool with the subject SKU using the hierarchy 400. At block 551, the analysis module 120 or forecasting module 122 can extract SKU related information from the hierarchy 400. As an example, other SKUs in the same subcategory as the subject SKU are likely to have similar characteristics, such as sales trends; and hence, would be useful in estimating a forecast for the subject SKU using different parameters, such as promotion mechanics. Similar pooling can be used to build models at other levels of the hierarchy 400; for example, at the category level, department level, or the like. At block 552, the forecasting module 122 can build machine learning models using the extracted SKU related information from the other SKUs.

An "ensemble" layer 560 can be used to generate a forecast. In this case, the forecasting module 122 can use each of the models trained using any one or more of the layers described above, the pooling layer 550, the SKUs with history layer 520, the prior layer 530, or the new SKU layer 540, to generate a forecast for the subject SKU and date parameter. The predictions from the individual models are automatically combined by the forecasting module 122 using statistical measures (for example, using a median value) or using machine learning techniques (for example, stacking) to generate a resultant forecast.

A substantial intended advantage of the embodiments described herein is that the system 100 can use an ensemble of multiple different machine learning models for forecasting or predicting for a single subject (for example, a single SKU). In some cases, these multiple different machine learning models can be trained (built) at different hierarchical levels of the hierarchy (for example, at the department level, category level, subcategory level, brand level, or SKU level).

In the event of insufficient data, models trained (built) at higher levels (broader levels) of the hierarchy can be used by the system 100 to make predictions using models trained (built) at lower levels (more specific levels) of the hierarchy. In some cases, the higher level models can be used for parameter specific instances where models are insufficient with respect to those parameters at the lower level of the hierarchy. Advantageously, the output of each of the machine learning models can be automatically combined to output a resultant forecast.

Although the invention has been described with reference to certain specific embodiments, various modifications thereof will be apparent to those skilled in the art without departing from the spirit and scope of the invention as outlined in the claims appended hereto. The entire disclosures of all references recited above are incorporated herein by reference.

The invention claimed is:

1. A computer-implemented method for generation of an automated forecast for a subject based on one or more input parameters, the method executed on at least one processing unit, the subject associated with an end node of a categorical hierarchy, the method comprising:
   receiving historical data associated with the subject;
   determining that the historical data associated with the subject is insufficient based on a feasibility of building a subject machine learning model to generate a forecast with a predetermined level of accuracy using the historical data associated with the subject;
   obtaining historical data associated with at least one ancestor node of the hierarchy that is one or more node levels above the subject and/or historical data associated with similar subjects to the subject;

building the subject machine learning model, comprising a plurality of machine learning models including both a Random Forest model and a Linear Regression model, and training the subject machine learning model using the historical data associated with the subject in combination with the historical data associated with the at least one ancestor node of the categorical hierarchy and/or the similar subjects, the at least one ancestor node selected by successively determining the sufficiency of the historical data until there is sufficient historical data or a root node is reached, and the similar subjects manually selected by a user or automatically selected based on a metric of similarity comprising at least one of hierarchy, history of relatedness, and other characteristics of similarity;

building a meta-machine learning model to generate the forecast by combining predictions from each of the plurality of machine learning models by stacking the plurality of machine learning models, the meta-machine learning model trained using the predictions from each of the machine learning models as features to the meta-machine learning model;

receiving the one or more input parameters;

generating a forecast for the subject using the meta-machine learning model provided with the one or more input parameters;

outputting the forecast.

2. The method of claim 1, wherein the at least one ancestor node of the categorical hierarchy comprises the ancestor node in the level of the hierarchy directly above the end node associated with the subject.

3. The method of claim 1 or 2, where there is not sufficient historical data associated with the subject and all the ancestor nodes up to the root node, obtaining historical data associated only with the similar subjects.

4. The method of claim 1, wherein the similar subjects comprise similar nodes to the subject, and wherein building the subject machine learning model comprises using historical data associated with the similar nodes.

5. The method of claim 4, wherein the similar nodes are those nodes that share a parent node with the subject in the categorical hierarchy.

6. The method of claim 4, wherein the similar nodes are those nodes that share an ancestor with the subject in the categorical hierarchy.

7. The method of claim 1, further comprising receiving the structure of the categorical hierarchy.

8. The method of claim 1 wherein the historical data associated with the at least one ancestor node and/or the historical data associated with the similar subjects is pooled and used to build and train the subject machine learning model.

9. A system for generation of an automated forecast for a subject based on one or more input parameters, the subject associated with an end node of a categorical hierarchy, the system comprising at least one processing unit and a data storage, the at least one processing unit in communication with the data storage and configured to execute:

an analysis module to receive historical data associated with the subject, and determine that the historical data associated with the subject is insufficient based on a feasibility of building a subject machine learning model to generate a forecast with a predetermined level of accuracy using the historical data associated with the subject; and a forecasting module to:

obtain historical data associated with at least one ancestor node of the categorical hierarchy that is one or more node levels above the subject and/or historical data associated with similar subjects to the subject;

build the subject machine learning model, comprising a plurality of machine learning models including both a Random Forest model and a Linear Regression model, and train the subject machine learning model using the historical data associated with the subject in combination with the of historical data associated with the at least one ancestor node of the categorical hierarchy and/or the similar subjects, the at least one ancestor node selected by successively determining the sufficiency of the historical data until there is sufficient historical data or a root node is reached, and the similar subjects manually selected by a user or automatically selected based on a metric of similarity comprising at least one of hierarchy, history of relatedness, and other characteristics of similarity;

build a meta-machine learning model to generate the forecast by combining predictions from each of the plurality of machine learning models by stacking the plurality of machine learning models, the meta-machine learning model trained using the predictions from each of the machine learning models as features to the meta-machine learning model;

receive the one or more input parameters;

generate a forecast for the subject using meta-machine learning model provided with the one or more input parameters;

output the forecast.

10. The system of claim 9, wherein the at least one ancestor node of the categorical hierarchy comprises the ancestor node in the level of the hierarchy directly above the end node associated with the subject.

11. The system of claim 9 or 10, where there is not sufficient historical data associated with the subject and all the ancestor nodes up to the root node, obtaining historical data associated only with the similar subjects.

12. The system of claim 9, wherein the similar subjects comprise similar nodes to the subject, and wherein the forecasting module builds the subject machine learning model using historical data associated with the similar nodes.

13. The system of claim 12, wherein the similar nodes are those nodes that share a parent node with the subject in the categorical hierarchy.

14. The system of claim 12, wherein the similar nodes are those nodes that share an ancestor with the subject in the categorical hierarchy.

15. The system of claim 9 wherein the historical data associated with the at least one ancestor node and/or the historical data associated with the similar subjects is pooled and used to build and train the subject machine learning model.

* * * * *